US008315210B2

(12) United States Patent
Baker et al.

(10) Patent No.: US 8,315,210 B2
(45) Date of Patent: Nov. 20, 2012

(54) ARQ SYSTEM WITH STATUS AND PACKET ACKNOWLEDGEMENT

(75) Inventors: Matthew P. J. Baker, Canterbury (GB); Timothy J. Moulsley, Caterham (GB)

(73) Assignees: Koninklijke Philips Electronics N.V., Eindhoven (NL); Sharp Corporation, Osaka (JP)

( * ) Notice: Subject to any disclaimer, the term of this patent is extended or adjusted under 35 U.S.C. 154(b) by 1379 days.

(21) Appl. No.: 10/523,940

(22) PCT Filed: Jul. 29, 2003

(86) PCT No.: PCT/IB03/03350
§ 371 (c)(1),
(2), (4) Date: Feb. 8, 2005

(87) PCT Pub. No.: WO2004/015911
PCT Pub. Date: Feb. 19, 2004

(65) Prior Publication Data
US 2006/0045010 A1 Mar. 2, 2006

(30) Foreign Application Priority Data

Aug. 13, 2002 (GB) .................................. 0218737.5
Aug. 16, 2002 (GB) .................................. 0219138.5

(51) Int. Cl.
H04W 72/14 (2009.01)
H04B 7/712 (2006.01)
H04B 1/00 (2006.01)
H04L 1/14 (2006.01)
(52) U.S. Cl. ........ 370/329; 370/337; 370/236; 370/252; 455/69; 455/522; 714/750
(58) Field of Classification Search .................. 370/230, 370/236, 329, 342, 332, 328, 330, 252, 337; 455/522, 450, 69; 714/748–750
See application file for complete search history.

(56) References Cited

U.S. PATENT DOCUMENTS

| 4,882,579 | A | * | 11/1989 | Siwiak .......................... 340/7.23 |
| 5,603,081 | A | * | 2/1997 | Raith et al. .................. 455/435.3 |
| 5,633,874 | A | * | 5/1997 | Diachina et al. .............. 370/329 |

(Continued)

FOREIGN PATENT DOCUMENTS

JP 2004527179 A 9/2004
(Continued)

OTHER PUBLICATIONS

LG Electronics; "Acknowledgement Scheme With HS-SCCH Error"; TSG-RAN Working Group 1 #24, Orlando, USA, Feb. 2002, TDOC R1-02-0361, 5 Page Document.

(Continued)

*Primary Examiner* — Kwang B Yao
*Assistant Examiner* — Candal Elpenord

(57) ABSTRACT

A communication system includes a downlink indicator channel for the transmission of an indicator signal indicating that a data packet is scheduled to be transmitted on a downlink data channel from a primary station to a secondary station. In response to detection of the indicator signal, the secondary station transmits a status signal, for example a negative acknowledgement signal, on an uplink channel to the primary station immediately before transmission of a positive or negative acknowledgement signal to indicate the status of the received data packet. By providing the primary station with two chances to detect the case where the secondary station fails to detect the indicator signal, peak power requirements of the uplink channel can be reduced, thereby reducing system interference levels.

25 Claims, 5 Drawing Sheets

U.S. PATENT DOCUMENTS

| | | | | |
|---|---|---|---|---|
| 5,729,541 | A * | 3/1998 | Hamalainen et al. | 370/337 |
| 5,918,174 | A | 6/1999 | Chennakeshu et al. | |
| 5,933,763 | A * | 8/1999 | Wang et al. | 340/7.22 |
| 6,035,209 | A * | 3/2000 | Tiedemann et al. | 455/522 |
| 6,320,855 | B1 * | 11/2001 | Shi | 370/332 |
| 6,430,163 | B1 * | 8/2002 | Mustajarvi | 370/310 |
| 6,434,396 | B1 * | 8/2002 | Rune | 455/502 |
| 6,816,478 | B1 * | 11/2004 | Laroia et al. | 370/349 |
| 6,910,168 | B2 | 6/2005 | Baker et al. | 714/751 |
| 7,062,294 | B1 * | 6/2006 | Rogard et al. | 455/562.1 |
| 7,181,223 | B1 * | 2/2007 | Pecen et al. | 455/452.1 |
| 7,185,256 | B2 * | 2/2007 | Miki et al. | 714/751 |
| 7,206,280 | B1 * | 4/2007 | Khan et al. | 370/216 |
| RE41,178 | E * | 3/2010 | Ahmavaara | 370/337 |
| 2002/0064167 | A1 * | 5/2002 | Khan et al. | 370/410 |
| 2002/0101835 | A1 | 8/2002 | Gerakoulis | |
| 2002/0105970 | A1 * | 8/2002 | Shvodian | 370/468 |
| 2002/0114291 | A1 * | 8/2002 | Moulsey et al. | 370/328 |
| 2003/0063583 | A1 * | 4/2003 | Padovani et al. | 370/329 |

FOREIGN PATENT DOCUMENTS

| | | |
|---|---|---|
| WO | 9826619 A2 | 6/1998 |
| WO | 2004015911 A1 | 2/2004 |

OTHER PUBLICATIONS

Philips: "Text Proposal for TR25.858 for ACK/NACK Signalling"; TSG-RAN WG1 #22, JEJU, South Korea, Nov. 2001, TSGR1(01)1202, 3 Page Document.

* cited by examiner

ARQ SYSTEM WITH STATUS AND PACKET ACKNOWLEDGEMENT

The present invention relates to a communication system and further relates to primary and secondary stations for use in such a system and to a method of operating such a system. While the present specification describes a system with particular reference to the Universal Mobile Telecommunication System (UMTS), it is to be understood that such techniques are equally applicable to use in other communication systems.

There is a growing demand in the mobile communication area for a system having the ability to download large blocks of data to a Mobile Station (MS) on demand at a reasonable rate. Such data could for example be web pages from the Internet, possibly including video clips or similar. Typically a particular MS will only require such data intermittently, so fixed bandwidth dedicated links are not appropriate. To meet this requirement in UMTS, a High-Speed Downlink Packet Access (HSDPA) scheme is being developed which may facilitate transfer of packet data to a mobile station at up to 4 Mbps.

A conventional component of a packet data transmission system is an ARQ (Automatic Repeat reQuest) process, for handling data packets received in error. For example, consider downlink packet transmission from a Base Station (BS) to a Mobile Station (MS) in HSDPA. When the MS receives a data packet it determines whether the packet has been corrupted, for example using Cyclic Redundancy Check (CRC) information. It then transmits a signal in a field allocated for this purpose to the BS, with a first signal used as an acknowledgement (ACK), to indicate that the packet was successfully received, and a second signal used as a negative acknowledgement (NACK), to indicate that the packet was received but corrupted. The signals may for example be different codewords or the same codeword transmitted at different powers. The BS requires an appropriate position for a decision threshold to be set so that it can decode the ACK/NACK messages correctly.

Since packet transmission is typically intermittent, discontinuous transmission (DTX) may typically be employed, so that nothing is transmitted by the MS in the ACK/NACK field unless a data packet has been received. In a typical scenario, the probability of the MS failing to detect a data packet that has been sent might be 1%. In this case it is desirable for the BS to interpret the DTX as if it were a NACK, so that the packet may be retransmitted to the MS. Interpreting DTX as a NACK may be achieved either by offsetting the decision threshold at the BS towards the ACK signal, or by means of the MS transmitting a NACK in every ACK/NACK field which does not correspond to a packet with correct CRC, whether or not a packet was detected.

A problem with the MS transmitting in every ACK/NACK field is that uplink interference is significantly increased, and in addition MS battery life is reduced. This is a particular problem when the packet traffic is bursty (as is often the case), resulting in the MS being required to transmit in many ACK/NACK fields when no packet had been transmitted to it.

A problem with offsetting the threshold for deciding between ACK and NACK commands is that the transmit power of the ACK command needs to be increased (as discussed below) in order to achieve an acceptably low probability of an ACK being interpreted as a NACK. As the probability of the MS transmitting an ACK should be much greater than that of transmitting a NACK in a well-designed communication system, increasing the ACK transmit power will significantly increase the average transmit power required in the ACK/NACK field.

Consider a typical communication system which requires that the probability of misinterpreting an ACK as a NACK is less than 1% and the probability of misinterpreting a NACK as an ACK is less than 0.01%. Assuming that the probability of the MS not detecting a packet is 1%, then the probability of misinterpreting DTX as a NACK should be less than 1% (so that the combined probability of the MS not receiving a packet and its DTX being interpreted as an ACK is the same as the probability of misinterpreting a NACK as an ACK, i.e. less than 0.01%). Simulations for typical mobile communication channels have shown that offsetting the decision threshold towards ACK enough to ensure that the probability of misinterpreting DTX as an ACK is less than 1% has the effect of requiring the ACK power to be greater than the NACK power, by as much as 10 or 20 dB in some scenarios.

One partial solution, disclosed in our co-pending United Kingdom patent application 0207696.6 (Applicant's reference PHGB 020034), is for the MS to transmit NACKs continuously after its initial ACK/NACK for as long as a timer is running. This avoids the need for the BS to offset its decision threshold, thereby reducing the required ACK power. However, a problem with this scheme is that the BS still has to offset its ACK/NACK decision threshold for the first of a series of packets, or alternatively tolerate a higher mis-detection probability for DTX after the first packet.

An object of the present invention is to address the above-identified problem.

According to a first aspect of the present invention there is provided a communication system having a downlink indicator channel for the transmission of an indicator signal indicating that a data packet is scheduled to be transmitted on a downlink data channel from a primary station to a secondary station, the secondary station having receiving means for receiving the indicator signal and the data packet, and acknowledgement means for transmitting a signal to the primary station to indicate the status of the received data packet, wherein the secondary station comprises means for transmitting on an uplink channel a status signal to indicate receipt of the indicator signal before transmission of a positive or negative acknowledgement to indicate the status of the received data packet.

By arranging for the secondary station to transmit a status signal to indicate reception of the indicator signal, the primary station has at least two chances to detect the case where the secondary station fails to receive the indicator signal (i.e. the primary station receiving nothing in both the time slot for receipt of the initial status signal and also receiving nothing in the time slot for an ACK or NACK in response to receipt of the data packet). Hence, the probability of the primary station misinterpreting DTX as an ACK or NACK is reduced and the peak power requirement of the uplink channel can be reduced, thereby reducing interference levels. In a preferred embodiment of the present invention, the status signal is a NACK.

According to a second aspect of the present invention there is provided a primary station for use in a communication system having a downlink indicator channel for the transmission of an indicator signal indicating that a data packet is scheduled to be transmitted on a downlink data channel from the primary station to a secondary station, wherein means are provided for receiving on an uplink channel a status signal from the secondary station to indicate receipt of the indicator signal before reception of a positive or negative acknowledgement to indicate the status of the data packet received by the secondary station.

According to a third aspect of the present invention there is provided a secondary station for use in a communication system having a downlink indicator channel for the transmission of an indicator signal indicating that a data packet is scheduled to be transmitted on a downlink data channel from a primary station to the secondary station, wherein receiving means are provided for receiving the indicator signal and the data packet, acknowledgement means are provided for transmitting on an uplink channel a signal to the primary station to indicate the status of the received data packet, and means are provided for transmitting a status signal to indicate receipt of the indicator signal before transmission of a positive or negative acknowledgement to indicate the status of the received data packet.

According to a fourth aspect of the present invention there is provided a method of operating a communication system having a downlink indicator channel for the transmission of an indicator signal indicating that a data packet is scheduled to be transmitted on a downlink data channel from a primary station to a secondary station, the method comprising the secondary station receiving the indicator signal and the data packet, and transmitting on an uplink channel a status signal to indicate receipt of the indicator signal before transmission of a positive or negative acknowledgement to indicate the status of the received data packet.

The present invention is based upon the recognition, not present in the prior art, that transmission of a status signal on receipt of an indication that a data packet is to be transmitted, together with a positive or negative acknowledgement relating to receipt of the data packet itself, reduces the peak uplink power requirements, thereby reducing system interference.

Embodiments of the present invention will now be described, by way of example, with reference to the accompanying drawings, wherein.

In the drawings the same reference numerals have been used to indicate corresponding features.

Figure 1:
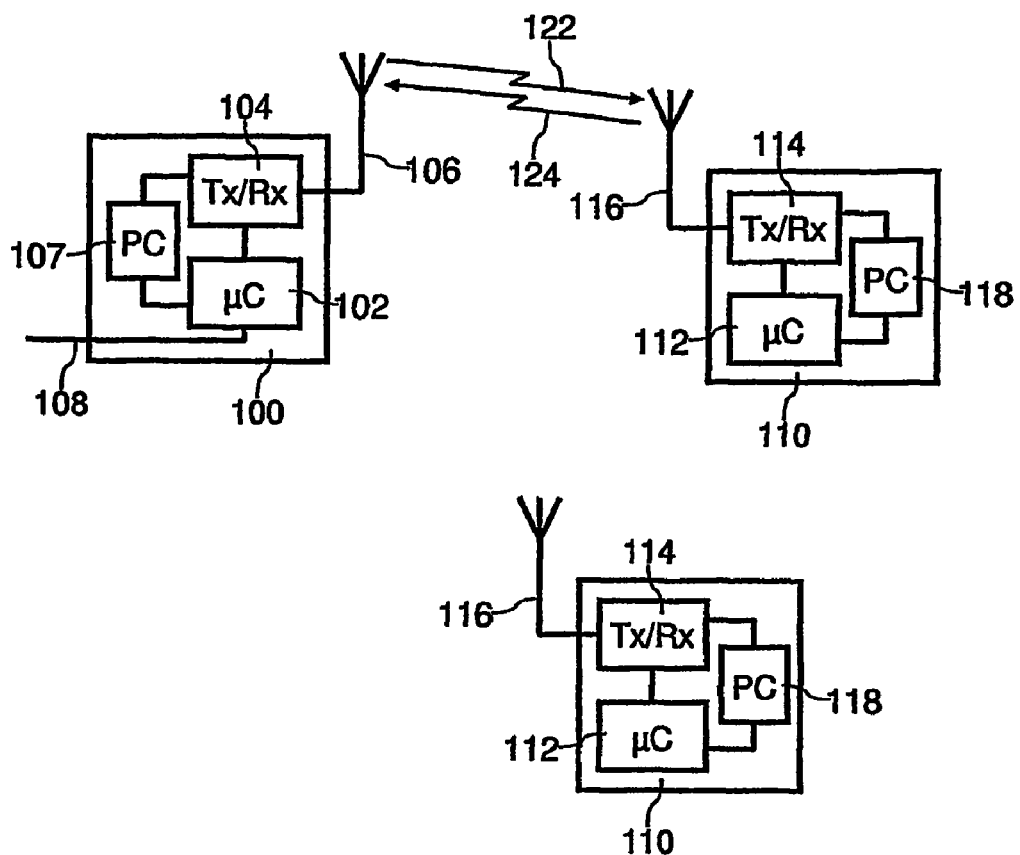
FIG. 1 is a block schematic diagram of a radio communication system.

Referring to FIG. 1, a radio communication system comprises a primary station (BS) 100 and a plurality of secondary stations (MS) 110. The BS 100 comprises a microcontroller (μC) 102, transceiver means (Tx/Rx) 104 connected to antenna means 106, power control means (PC) 107 for altering the transmitted power level, and connection means 108 for connection to the PSTN or other suitable network. Each MS 110 comprises a microcontroller (μC) 112, transceiver means (Tx/Rx) 114 connected to antenna means 116, and power control means (PC) 118 for altering the transmitted power level. Communication from BS 100 to MS 110 takes place on a downlink channel 122, while communication from MS 110 to BS 100 takes place on an uplink channel 124.

Figure 2:
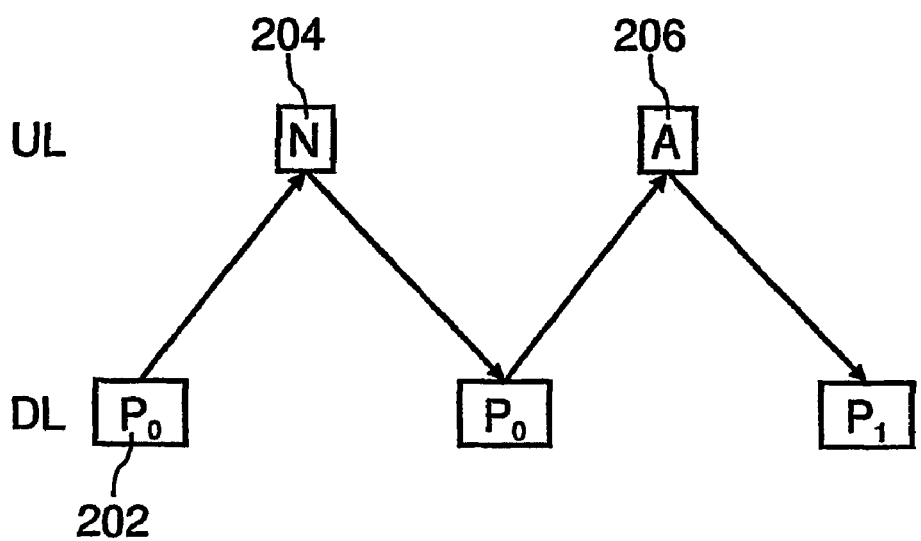
FIG. 2 is a diagram illustrating operation of a known stop-and-wait ARQ scheme.

An example of the operation of a known stop-and-wait ARQ scheme is illustrated in FIG. 2. Data packets 202, identified as $P_n$ where n is a one-bit sequence number, are transmitted in allocated time slots on a downlink channel (DL) 122 from a BS 100 to a MS 110. The first data packet $P_0$, with sequence number 0, is received in a corrupted state by the MS 110, which therefore transmits a negative acknowledgement (N) 204 in a field reserved for transmission of positive and negative acknowledgements. In response to this the BS 100 retransmits the first data packet 202, which this time is received correctly by the MS 100 which transmits an acknowledgement (A) 206. The BS 100 then transmits the next packet, with sequence number 1. The BS 100 also retransmits a data packet 202 if it receives no acknowledgement within a predetermined time-out period (in case the MS 110 did not receive the packet at all or the acknowledgement was lost). If the MS 110 did in fact receive the previously transmitted packet 202 it can determine that the received packet 202 is a retransmission as it has the same sequence number as the previous packet.

Figure 3:
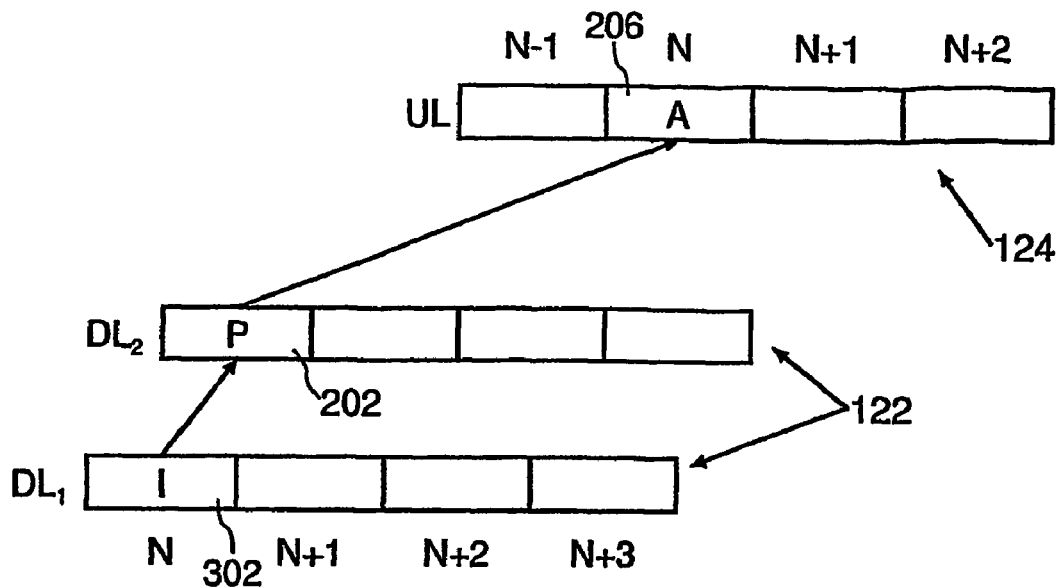
FIG. 3 is a diagram illustrating operation of a basic HSDPA packet transmission scheme.

Operation of HSDPA as currently-specified is shown in FIG. 3, which shows in simplified form approximate timing relationships between the various channels used to provide HSDPA. Presence of a data packet 202 scheduled for transmission to the MS 110 is signalled by transmission of an indicator signal I 302 in sub-frame N of a downlink indicator channel $DL_1$ (the High Speed Shared Control CHannel, HS-SCCH). This is followed by transmission of the data packet P 202 on a downlink data channel $DL_2$ (the High Speed Downlink Shared CHannel, HS-DSCH). If the MS 110 correctly decodes the packet 202 it sends an ACK 206 in sub-frame N of an uplink channel, a High Speed Dedicated Physical Control CHannel (HS-DPCCH), as shown. If the packet is not correctly decoded, a NACK 204 is sent instead.

If the MS 110 fails to detect the indicator signal 302, it will not transmit anything (i.e. it uses Discontinuous Transmission, DTX) in sub-frame N of the uplink channel 124. If the BS 100 then wrongly detects the DTX as an ACK 206, the BS will not perform a physical-layer retransmission of the packet. This means that higher-layer protocols are required if the MS 110 is to be able to receive correctly the missed packet; however, such protocols generate significant extra signalling traffic (and hence more interference) and may be too slow for real-time applications.

In order for the BS to limit the probability of wrongly detecting DTX as ACK 206 (a probability of 0.01 seems to be considered acceptable), it must offset its ACK/NACK decision threshold to favour detection of NACKs. However, this means that the power required for ACK messages is increased, and can be as high as 10-20 dB above that required for a normal uplink DPCCH.

A partial solution to this problem, disclosed in our co-pending United Kingdom patent application 0207696.6 (Applicant's reference PHGB 020034), is described with reference to FIG. 4. In this scheme the MS 110 transmits an ACK 206 (as shown) or NACK 204 in sub-frame N of the uplink channel 124, and then continues to transmit NACKs 204 in every uplink sub-frame corresponding to a HS-DSCH sub-frame in which a packet was not detected via the HS-SCCH, as long as a timer is running. In other words, while the timer is running a NACK 204 is transmitted in sub-frame N of the uplink channel 124 unless a data packet 202 was correctly decoded in sub-frame N of the downlink HS-DSCH. In this way, during contiguous (or nearly contiguous) bursts of packets the BS 100 does not have to offset its detection threshold (except perhaps for the first packet in each burst), thereby reducing the required ACK power.

However, a drawback of this scheme is that the BS 100 still has to offset its ACK/NACK decision threshold for the first packet in each burst, or else tolerate a higher mis-detection probability for DTX after the first packet. Thus the peak transmit power required for the uplink channel 124 is not improved (unless the BS 100 does not offset its detection threshold for the first packet either, in which case the first packet in each burst will be subject to a higher probability of DTX misinterpretation). Furthermore, if packets only occur individually (i.e. separated by a longer period than the duration of the timer), then the scheme of transmitting NACKs 204 while the timer is running offers no benefit.

An improved scheme, in accordance with the present invention, is described with reference to FIG. 5. In this scheme, when the MS 110 detects a packet indication 302 on the downlink indicator channel it transmits a NACK 204 as a status signal in the sub-frame before the sub-frame in which it would normally transmit the ACK 206 or NACK 204 relating to the data packet 202. In the illustrated scenario, an indicator signal 302 is transmitted in sub-frame N of is the indicator channel and in response the MS 110 transmits a NACK 204 in sub-frame N−1 of the uplink channel 124 (unless a data packet has been successfully decoded from sub-frame N−1 of the downlink data channel). In other embodiments of the present invention, the status signal need not be a NACK 204. For example, it could be an ACK 206 or some other suitable signal.

Using this scheme, a communication system can be designed so that the probability of the BS 100 failing to detect that the MS 110 has failed to detect a packet indication 302 transmitted on the downlink indicator channel $DL_1$ is shared between at least two transmissions on the uplink channel 124. Thus if the overall probability of DTX being detected as an ACK 206 is required to be less than 0.01, the power of the NACK transmission in sub-frame N−1 can be set so that the probability of the BS 100 wrongly detecting DTX in sub-frame N−1 as a NACK 204 is 0.1, and the power of the ACK transmission in sub-frame N can be set so that the probability of the BS 100 wrongly detecting DTX in sub-frame N as an ACK 206 is also 0.1. In this way the peak power requirement for the uplink channel 124 is minimised. It follows that the transmit power used for the NACK transmission in sub-frame N−1 may be different from the transmit power used for other NACKs. In fact, it is preferable for the transmit power used for the NACK transmission in sub-frame N−1 to be the same as the transmit power normally used for ACK transmissions.

Figure 4:
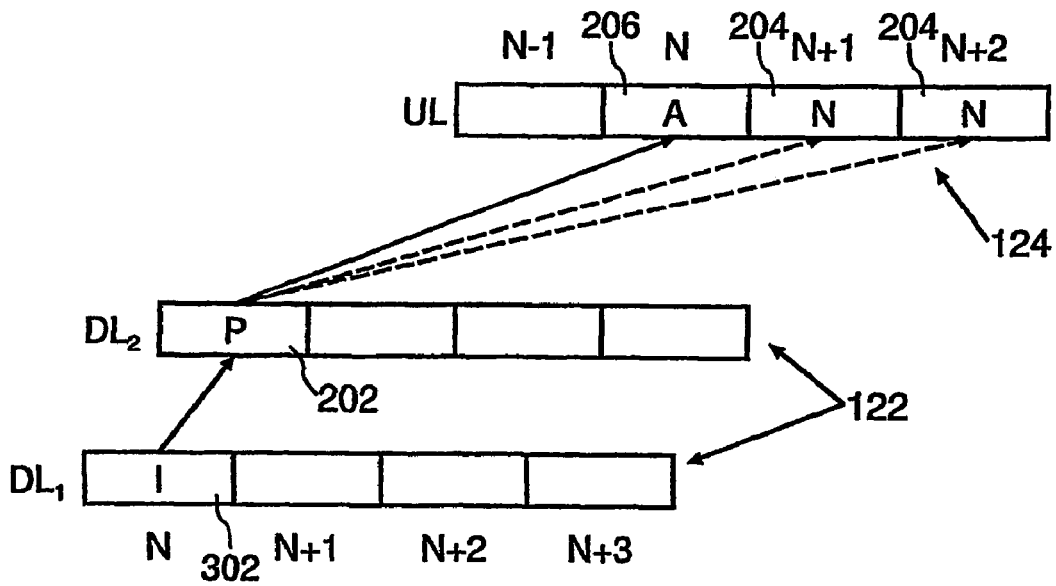
FIG. 4 is a diagram illustrating operation of an improved HSDPA packet transmission scheme including repeated NACKs.
Figure 5:
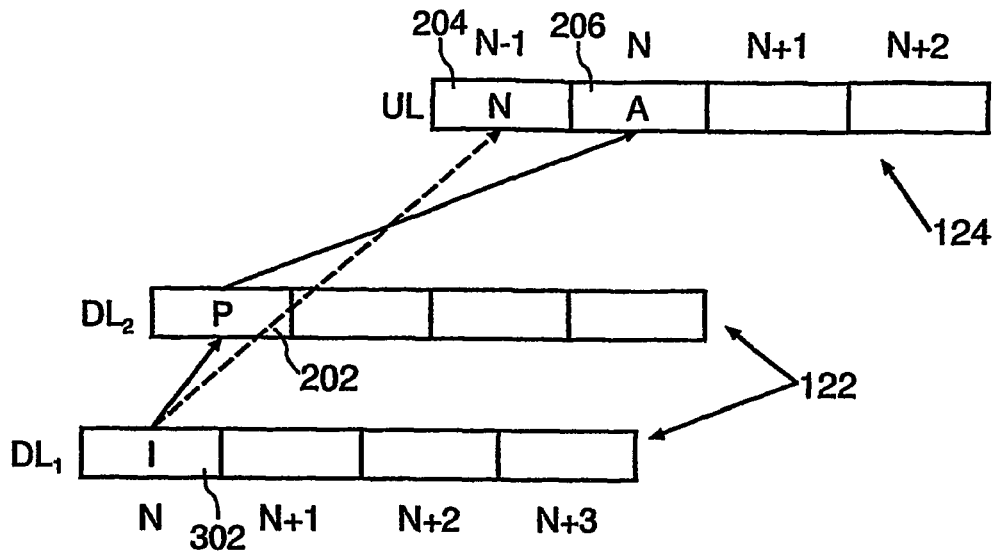
FIG. 5 is a diagram illustrating operation of an improved HSDPA packet transmission scheme including signalling detection of a packet indication.

In a preferred embodiment, the scheme of FIG. 5 can be combined with that of FIG. 4. In particular, a special case of the behaviour in FIG. 4 may be used, whereby the timer runs for exactly one sub-frame after sub-frame N. Thus when an ACK or NACK has been transmitted in sub-frame N, the MS 110 will always transmit in addition a NACK 204 in sub-frame N+1, unless another packet follows immediately in sub-frame N+1 on the downlink data channel and is decoded correctly, in which case an ACK is transmitted in sub-frame N+1 on the uplink channel 124. Accordingly, the BS 100 never has to distinguish DTX from ACK 206 in one sub-frame alone. A particular advantage of this embodiment of the present invention is that the timer does not need to run for longer than one sub-frame to obtain the benefit of the reduced ACK power requirement.

According to the current HSDPA specifications, it is also possible for a system to require ACKs or NACKs to be repeated a number of times (up to three repeats) in subsequent sub-frames in order to increase their reliability without increasing their transmit power. No packets may be transmitted on the downlink data channel in any sub-frame corresponding to a sub-frame on the uplink channel 124 containing a repeat of an ACK/NACK from a previous packet.

In this case, the present invention could be applied so that the MS 110 transmits NACKs 204 in both sub-frame N−1 and sub-frame N−2 on detection of a packet indication on the indicator channel, in order to keep the power required for this preliminary NACK 204 similar to the power required for the normal ACK/NACK transmissions. However, there is not sufficient time between an indicator signal 302 in sub-frame N of the indicator channel and sub-frame N−3 on the uplink channel 124 for a NACK 204 to be transmitted in sub-frame N−3 of the uplink channel in a system where the number of ACK/NACK repeats is set to a value greater than 1.

Figure 6:
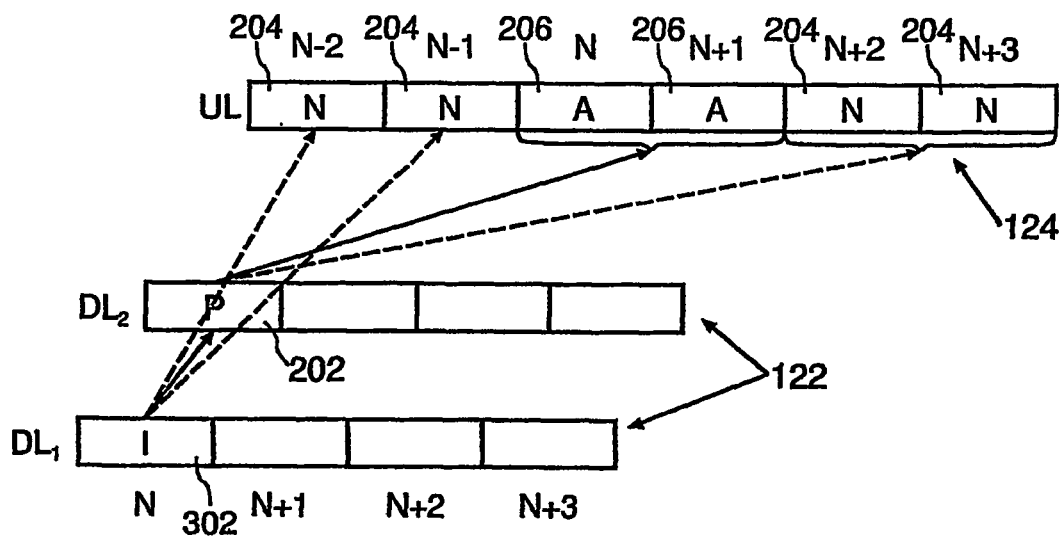
FIG. 6 is a diagram illustrating operation of an improved HSDPA packet transmission scheme including signalling detection of a packet indication and repeated NACKs.

In such a system, the timer could still be used so as to cause a further NACK 204 to be transmitted after the normal ACK/NACK (although the timer would need to run for longer than one sub-frame). In this case, this further NACK would be repeated over the same number of sub-frames as the normal ACK/NACKs, and would follow the last repetition of the normal ACK/NACK. This is illustrated in FIG. 6 for the case where the number of repeats of each ACK/NACK is set at 1.

The presence of a data packet is signalled by an indicator signal 302 in the normal way in sub-frame N. A NACK 204 is then transmitted in sub-frames N−2 and N−1 (unless a packet on the downlink data channel in sub-frame N−2 has already has been correctly decoded, in which case an ACK 206 is sent in sub-frames N−2 and N−1). If the packet is correctly decoded, then an ACK 206 is sent on the uplink channel 124 in sub-frame N, and repeated in sub-frame N+1. No packet may be transmitted on the downlink data channel in sub-frame N+1. If the packet is not correctly decoded, a NACK 206 is sent on the uplink channel 124 in sub-frame N and repeated in sub-frame N+1. Additionally, according to the use of the timer, a NACK 204 is always sent in sub-frames N+2 and N+3 of the uplink channel 124, unless a packet is correctly decoded from sub-frame N+2 on the downlink data channel, in which case an ACK 206 is sent in sub-frames N+2 and N+3.

It may be desirable to be able to switch transmission of a NACK 206 to indicate reception of an indicator signal 302 on and off by means of signalling from the BS 100. This signalling may be combined with switching on and off the timer for transmission of NACKs 204 after the normal packet acknowledgement (i.e. both aspects switched on or off together), alternatively the two aspects may be switched on and off independently of each other. The switching could be determined by the state of the MS 110, for example whether or not it is in soft handover, or the selected number of repeats of ACKs and NACKs.

One example where it could be desirable to switch off the use of the present invention is if the BS 100 is specifically trying to detect DTX as a separate case from NACK. This may be the case if, for example, different redundancy versions are used for retransmissions, in which case they cannot be directly combined in the same soft-buffer at the MS 110. This would not, however, present a problem if Chase combining were used.

Figure 7:
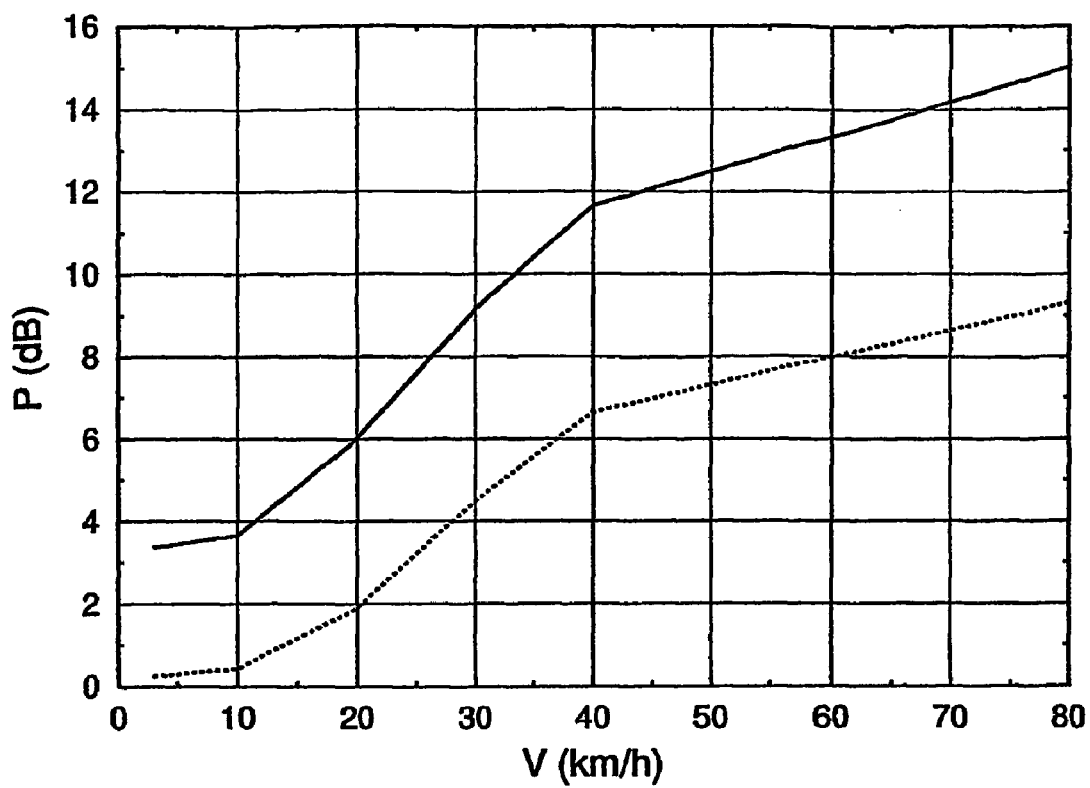
FIG. 7 is a graph showing peak power requirement for the schemes of FIG. 3 (shown as a solid line) and FIG. 6 (shown as a dashed line)

Simulation results showing the benefit (in terms of peak uplink channel 124 power requirement of the present-invention, combined with a 1-sub-frame timer, are shown in FIG. 7. This is a graph of P, the peak uplink power requirement relative to the normal uplink (DPCCH) transmission power, in dB against V, the speed of the MS 110 in km/h. In this simulation the overall probability of mis-detecting DTX as ACK 206 is required to be 0.01. Power requirements without an initial NACK or subsequent timer are shown as a solid line, and requirements with an initial NACK and subsequent one sub-frame duration timer are shown as a dashed line. It can be seen that use of the two techniques together provides a benefit of between 3 and 6 dB.

Figure 8:
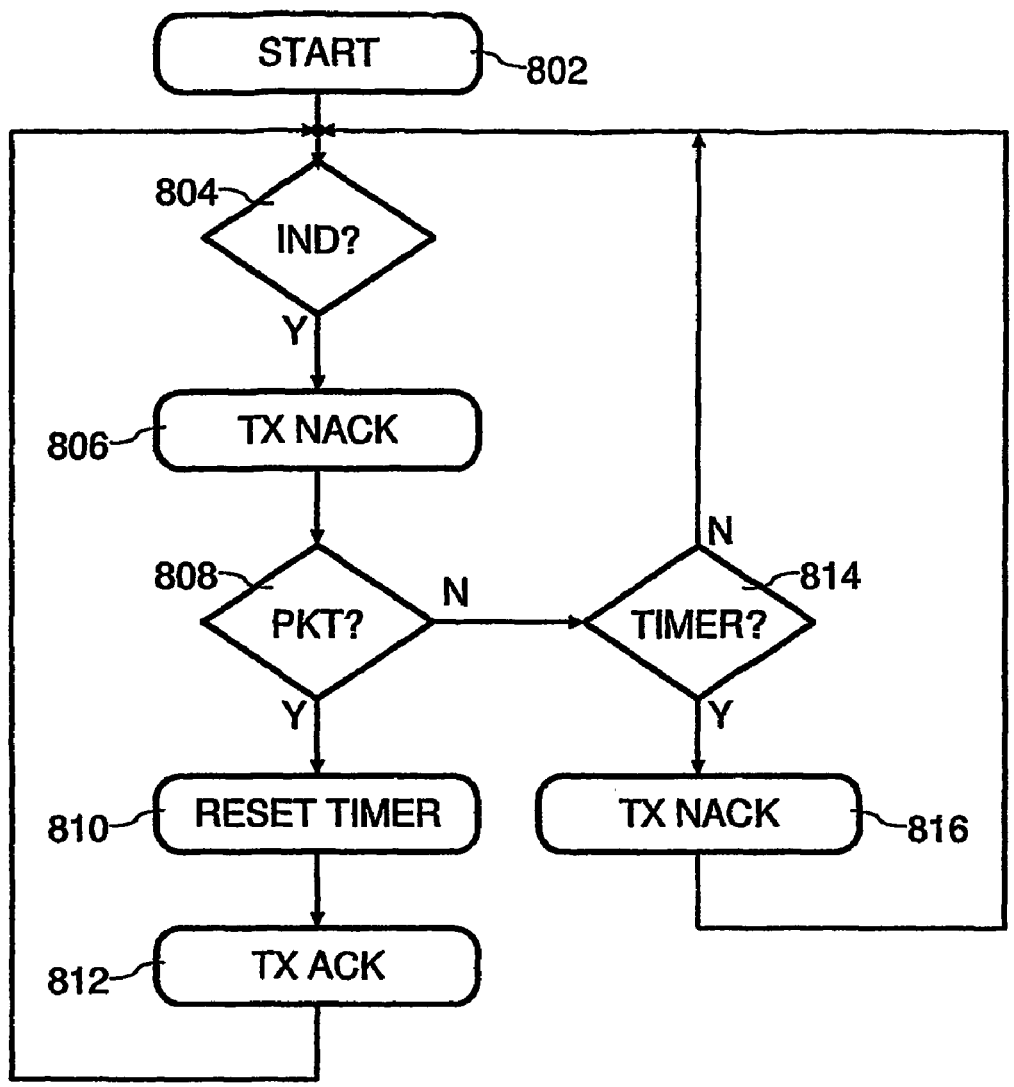
FIG. 8 is a flow chart showing a method of operating a packet data transmission system in accordance with the present invention.

The operation of such a combined scheme is summarised by the flow chart shown in FIG. 8. The method starts, at step 802, when the MS 110 is ready to receive data packets 202. Test 804 relates to the MS 110 determining whether an indicator signal 302 for a data packet has been received. If it has, the MS 110 transmits, at step 806, a negative acknowledgement and proceeds to receive the data packet. Test 808 relates to the MS 110 determining whether the data packet has been received successfully. If a data packet 202 is received test 808 is passed, the timer is reset, at step 810, an acknowledgement 206 is transmitted, at step 812, and the MS 110 returns to test 804 to check for an indicator signal 302. Resetting the timer may involve starting a timer, if one is not already running, or restarting an already-running timer.

If the data packet is not successfully received, test 808 is failed and a further test 814 is made to determine whether the timer is running. If the timer is running, the test 814 is passed and the MS 110 transmits, at step 816, a negative acknowledgement 204 in the corresponding ACK/NACK field, then returns to test 804. If the timer is not running, test 814 is failed and the MS 110 returns directly to test 804.

The above description is aimed at UMTS FDD (Frequency Division Duplex) mode. The invention could also be applied to TDD (Time Division Duplex) mode. In this case the fact that the uplink and downlink channel use different time slots at the same frequency (i.e. reciprocal channel) could reduce the need for signalling of channel information.

The description above related to the BS 100 performing a variety of roles relating to the present invention. In practice these tasks may be the responsibility of a variety of parts of the fixed infrastructure, for example in a "Node B", which is the part of the fixed infrastructure directly interfacing with a MS 110, or at a higher level in the Radio Network Controller (RNC). In this specification, the use of the term "base station" or "primary station" is therefore to be understood to include the parts of the network fixed infrastructure involved in an embodiment of the present invention.

From reading the present disclosure, other modifications will be apparent to persons skilled in the art. Such modifications may involve other features which are already known in the design, manufacture and use of communication systems and component parts thereof, and which may be used instead of or in addition to features already described herein.

In the present specification and claims the word "a" or "an" preceding an element does not exclude the presence of a plurality of such elements. Further, the word "comprising" does not exclude the presence of other elements or steps than those listed.

The invention claimed is:

1. A communication system comprising: a downlink indicator channel for transmission of an indicator signal indicating that a data packet is scheduled to be transmitted on a downlink data channel from a primary station to a secondary station, the secondary station communicating through the downlink indicator channel for receiving the indicator signal and downlink data channel for receiving the data packet, and the secondary station communicating through an uplink channel, divided into a plurality of consecutive sub-frames, for transmitting a positive or negative acknowledgement to the primary station to indicate the status of the received data packet, and for transmitting a status signal in the sub-frame immediately before the sub-frame in which the secondary station transmits the positive or negative acknowledgement to indicate the status of the received data packet, said status signal indicating receipt of the indicator signal.

2. The system as claimed in claim 1, wherein the status signal is the same signal as that used for a negative acknowledgement.

3. A primary station for use in a communication system, comprising a downlink indicator channel transmitting an indicator signal indicating that a data packet is scheduled to be transmitted on a downlink data channel from the primary station to a secondary station, the primary station communicating through an uplink channel, which is divided into a plurality of consecutive sub-frames, for receiving a status signal from the secondary station to indicate receipt of the indicator signal in a sub-frame immediately before a sub-frame in which the primary station receives a positive or a negative acknowledgement to indicate the status of the data packet received by the secondary station.

4. The primary station as claimed in claim 3, wherein the status signal is a same signal as that used for a negative acknowledgement.

5. A secondary station for use in a communication system having a downlink indicator channel for the transmission of an indicator signal indicating that a data packet is scheduled to be transmitted on a downlink data channel from a primary station to the secondary station, the secondary station comprising downlink indicator channel for receiving the indicator signal and the downlink data channel for receiving the data packet, and an uplink channel, divided into a plurality of consecutive sub-frames, for transmitting a positive or negative acknowledgement to the primary station to indicate a status of the received data packet, and for transmitting a status signal in a sub-frame immediately before a sub-frame in which the secondary station transmits the positive or negative acknowledgement to indicate the status of the received data packet, said status signal indicating receipt of the indicator signal.

6. The secondary station as claimed in claim 5, wherein the status signal is a same signal as that used for a negative acknowledgement.

7. The secondary station as claimed in claim 5, wherein the status signal is transmitted at a same power as a positive acknowledgement.

8. The secondary station as claimed in claim 5, further comprising means for resetting a timer on receipt of the indicator signal and for modifying a characteristic of uplink transmissions until the timer expires.

9. The secondary station as claimed in claim 8, further comprising means for transmitting negative acknowledgements for each time at which a data packet could have been transmitted if no transmission of a data packet is detected, and wherein the negative acknowledgements are only transmitted until the timer expires.

10. The secondary station as claimed in claim 8 wherein the timer has a duration of one sub-frame.

11. The secondary station as claimed in claim 9, further comprising means for transmitting a positive or negative acknowledgement of a received data packet N times, where N is predetermined, and for transmitting subsequent negative acknowledgements until the timer expires.

12. The secondary station as claimed in claim 11, wherein the timer has a duration of N sub-frames.

13. The secondary station as claimed in claim 5, further comprising means for transmitting a plurality of status signals before transmission of the positive or negative acknowledgment to indicate the status of the received data packet.

14. A method of operating a communication system, said communication system having a downlink indicator channel for the transmission of an indicator signal indicating that a data packet is scheduled to be transmitted on a downlink data channel from a primary station to a secondary station, the method comprising
the secondary station:
receiving the indicator signal and the data packet, and
transmitting on an uplink channel, divided into a plurality of consecutive sub-frames, a status signal in a sub-frame immediately before a sub-frame in which the secondary station transmits a positive or a negative acknowledgement to indicate a status of the received data packet, said status signal indicating receipt of the indicator signal.

15. A communication system comprising:
a primary station; and
a secondary station;
wherein the primary station is configured to transmit an indicator signal followed by a data packet to the secondary station, and
in response to reception of the indicator signal and the data packet, the secondary station being configured to transmit a status signal to indicate reception of the indicator signal in a sub-frame immediately before a sub-frame in which the secondary station transmits a positive acknowledgement or a negative acknowledgement to indicate a status of the received data packet.

16. The communication system of claim 15, wherein the status signal is a same signal as the negative acknowledgement.

17. The communication system of claim 15, wherein the primary station has two chances to detect a case where the secondary station fails to detect the indicator signal or the data packet so that a power requirement of an uplink channel from the secondary station to the primary station is reduced.

18. The communication system of claim 15, wherein the secondary station further comprises a timer configured to be reset on receipt of the indicator signal, and wherein the secondary station is further configured to transmit negative acknowledgements for each time a data packet could have been transmitted if no transmission of a data packet is detected, and the negative acknowledgements being only transmitted until the timer expires.

19. A primary station comprising:
a transmitter configured to transmit an indicator signal followed by a data packet to a secondary station, and
a receiver configured to receive a status signal from the secondary station to indicate reception of the indicator signal by the secondary station in a sub-frame immediately before a sub-frame in which the primary station receives a positive acknowledgement or a negative acknowledgement to indicate a status of the data packet received by the secondary station.

20. The primary station of claim 19, wherein the status signal is a same signal as the negative acknowledgement.

21. A secondary station comprising:
a receiver configured to receive an indicator signal followed by a data packet from a primary station; and
a transmitter configured to transmit a status signal to indicate reception of the indicator signal in a sub-frame immediately before a sub-frame in which the secondary station transmits a positive acknowledgement or a negative acknowledgement to indicate a status of the received data packet.

22. The secondary station of claim 21, wherein the status signal is a same signal as the negative acknowledgement.

23. The secondary station of claim 21, further comprising a timer configured to be reset on receipt of the indicator signal, and wherein the secondary station is further configured to transmit negative acknowledgements for each time a data packet could have been transmitted if no transmission of a data packet is detected, and the negative acknowledgements being only transmitted until the timer expires.

24. A method of communication between a primary station and a secondary station comprising:
transmitting by the primary station an indicator signal followed by a data packet to the secondary station; and
in response to reception of the indicator signal and the data packet, the secondary station transmitting a status signal to indicate the reception of the indicator signal in a sub-frame immediately before a sub-frame in which the secondary station transmits a positive acknowledgement or a negative acknowledgement to indicate a status of the received data packet.

25. The method of claim 24, wherein the status signal is a same signal as the negative acknowledgement.

\* \* \* \* \*